(12) United States Patent
Chen et al.

(10) Patent No.: US 12,508,532 B2
(45) Date of Patent: Dec. 30, 2025

(54) METHOD FOR PURIFICATION OF HIGH-PURITY OR ULTRAHIGH-PURITY GAS BY LOW TEMPERATURE ADSORPTION

(71) Applicant: SOUTHWEST INSTITUTE OF CHEMICAL CO., LTD, Sichuan (CN)

(72) Inventors: Jian Chen, Sichuan (CN); Xu Li, Sichuan (CN); Yupeng Tao, Sichuan (CN); Jian Wang, Sichuan (CN); Hongyu Zhang, Sichuan (CN); Jianfeng Zhang, Sichuan (CN); Yun Yang, Sichuan (CN); Yi Wu, Sichuan (CN); Jiangtao Pu, Sichuan (CN)

(73) Assignee: SOUTHWEST INSTITUTE OF CHEMICAL CO., LTD, Sichuan (CN)

( * ) Notice: Subject to any disclaimer, the term of this patent is extended or adjusted under 35 U.S.C. 154(b) by 357 days.

(21) Appl. No.: 18/246,724

(22) PCT Filed: Nov. 2, 2022

(86) PCT No.: PCT/CN2022/129255
§ 371 (c)(1),
(2) Date: Mar. 27, 2023

(87) PCT Pub. No.: WO2023/083072
PCT Pub. Date: May 19, 2023

(65) Prior Publication Data
US 2024/0299874 A1    Sep. 12, 2024

(30) Foreign Application Priority Data
Nov. 9, 2021 (CN) .......................... 202111317677.4

(51) Int. Cl.
*B01D 53/02* (2006.01)

(52) U.S. Cl.
CPC .... *B01D 53/02* (2013.01); *B01D 2259/40086* (2013.01)

(58) Field of Classification Search
CPC .... B01D 53/02; B01D 53/04; B01D 53/0462; B01D 53/0476; B01D 53/0446
See application file for complete search history.

(56) References Cited

U.S. PATENT DOCUMENTS

| 3,085,379 A * | 4/1963 | Kiyonaga .............. B01D 53/04 95/96 |
|---|---|---|
| 2002/0107294 A1 | 8/2002 | Hufton et al. |
| 2008/0006151 A1 | 1/2008 | Baksh et al. |

FOREIGN PATENT DOCUMENTS

| CN | 1102138 A | 5/1995 |
|---|---|---|
| CN | 101530717 A | 9/2009 |

(Continued)

*Primary Examiner* — Sharon Pregler
(74) *Attorney, Agent, or Firm* — NKL Law; Allen Xue

(57) ABSTRACT

A method for purification of high-purity or ultrahigh-purity gas by low temperature adsorption, has the following steps: adsorbing and removing impurity in feed gas at low temperature, obtaining high-purity or ultrahigh-purity product gas with a purity higher than 99.99%, vacuumizing an adsorber by using a vacuum pump during regeneration, and introducing a small amount of gas with low impurity content into the adsorber to regenerate the adsorbent while vacuumizing. The temperature of the adsorber is not obviously increased during regeneration. In this method, the adsorber does not need to be deliberately heated in the regeneration process, the consumption of a large amount of energy and materials caused by frequent heating and cooling of the adsorber is avoided.

9 Claims, 3 Drawing Sheets

(56) References Cited

FOREIGN PATENT DOCUMENTS

| | | |
|---|---|---|
| CN | 102491272 A | 6/2012 |
| CN | 105268282 A | 1/2016 |
| CN | 105858606 A | 8/2016 |
| CN | 113264506 A | 8/2021 |
| CN | 114130155 A | 3/2022 |

* cited by examiner

METHOD FOR PURIFICATION OF HIGH-PURITY OR ULTRAHIGH-PURITY GAS BY LOW TEMPERATURE ADSORPTION

TECHNICAL FIELD

The present invention belongs to the field of gas separation, and particularly relates to a method for purification of high-purity or ultrahigh-purity gas by low temperature adsorption.

BACKGROUND

The high-purity and ultra-high-purity gas is widely used in electronic industry, petrochemical industry, metal smelting, national defense cutting-edge and scientific research and other sectors. Taking high purity electronic gas as an example, the market scale reached RMB 9.2 billion in 2019. At present, the high-purity and ultra-high-purity gas is mainly produced by distillation. The distillation process is mature, but the energy consumption is high, which is not suitable for separating gas components with similar boiling points. As a widely used gas separation method, the adsorption separation method has the advantages of low energy consumption and high degree of automation. At low temperatures, the adsorption capacity of the adsorbent to the impurity gas is significantly enhanced. Especially when producing high-purity and ultra-high-purity gas, it can effectively adsorb trace amount of impurity gas, which is conducive to obtaining high-purity gas products. However, due to the strong adsorption capacity of the adsorbent to the impurity gas at low temperature, regeneration becomes very difficult after the adsorbent is saturated. The commonly used vacuumizing regeneration method cannot regenerate the adsorbent completely, and the residual impurity gas on the adsorbent will seriously affect the purity of the product gas in the next adsorption. Even if technicians strengthen the effect of vacuumizing regeneration through various technical means, such as extending the vacuumizing time greatly or using high-power vacuum pumps, it is difficult to vacuumize and regenerate the adsorbent completely.

Against this background, considering that the adsorption capacity of the adsorbent to the impurity gas will be significantly reduced after heating, which is conducive to the desorption and regeneration of the adsorbent, the current technical solution is to adsorb at low temperature, and regenerate the adsorbent after heating. Specifically, during adsorption, the adsorber is placed in a liquid nitrogen container. During regeneration, the liquid nitrogen is removed or directly heated to evaporate the liquid nitrogen, so that the adsorber can be heated up and the adsorbent can be regenerated. The principle of this method is simple, but the process is complex, which requires frequent heating and cooling. Not only is there a large loss of liquid nitrogen, but also it takes a long time to heat or cool. The adsorbent recycling efficiency is low, and the economic benefit is poor, which makes it difficult for large-scale continuous production.

The Chinese patent CN200910119273.7 discloses "Low Temperature Adsorption Method for Continuously Producing Ultra-pure Gas". This method is to cool the feed gas with a liquid nitrogen evaporator, and then cool the adsorber and adsorbent with low-temperature feed gas. During regeneration, hot purge gas is used to heat, purge and regenerate the adsorber. Because the heat capacity of the gas is generally small, the amount of purge gas required to heat the adsorber and adsorbent to the required temperature is very large, about 10 times more than the amount of product gas, and the material and energy consumption is very large.

SUMMARY

The present invention aims to solve the difficulty in heating required during regeneration of low-temperature adsorption device at present, and provides a low-temperature adsorption method that the adsorber does not need to be deliberately heated in the regeneration process. According to this method, consumption of a large amount of energy and materials caused by frequent heating and cooling of the adsorber is avoided, and the low-temperature adsorption method has the advantages that operation is easy, energy consumption is low, and the device is suitable for long-time continuous operation.

To achieve the above purpose, the specific technical solution of the present invention is as follows:

A method for purification of high-purity or ultrahigh-purity gas by low temperature adsorption, comprising the following steps:

adsorption: feed gas containing impurities is blown into an adsorber filled with adsorbent, and the temperature of the adsorber is controlled lower than 0° C., so that the impurity gas is adsorbed on the adsorbent, and high-purity or ultra-high-purity product gas with purity of greater than or equal to 99.99% is obtained from a non-adsorptive phase;

depressurization: after the adsorption step, the residual gas in the adsorber is released, and the pressure in the adsorber is reduced to or close to the normal pressure;

regeneration: a vacuum pump is used to vacuumize the adsorber; at the same time, a small amount of gas with low impurity component content is introduced into the adsorber to regenerate the adsorbent, and the difference between the temperature of the adsorber during regeneration and the temperature of the adsorber during adsorption is less than 20° C.;

pressurization: the pressure of the adsorber is increased to the adsorption pressure.

As a preferred embodiment of the present application, the method is especially suitable for removing impurity gas from the following feed gases, i.e., the main component of the feed gas is any one of helium, hydrogen, argon, neon, krypton, xenon, radon, deuterium, tritium, nitrogen, oxygen, carbon monoxide and methane, and the impurity gas is any one of or the mixture of more of hydrogen, argon, neon, krypton, xenon, radon, deuterium, tritium, nitrogen, oxygen, carbon monoxide, methane, carbon dioxide, water or hydrocarbons. Generally, the volume content of the main component in the feed gas is more than 90%, preferably more than 99%, but even if the volume content of the main component in the feed gas is less than 90%, the purpose can be achieved by the method of the present application.

As a preferred embodiment of the present application, in the adsorption process, the temperature of the adsorber is −200° C. to −120° C., more preferably −190° C. to −170° C.

The temperature of the adsorber in the present application is always in a relatively stable low temperature state, and the method of keeping the adsorber at low temperature can be freely selected. Typical methods are as follows:

1. The adsorber is placed in a cryogenic container, such as a cryogenic container filled with liquid nitrogen;
2. The adsorber is insulated, the feed gas is cooled through a heat exchanger, and then the low-temperature feed gas is introduced into the adsorber to cool the adsorber.

However, no matter which method is used, there is no need to deliberately introduce materials or energy to heat the adsorber during regeneration of the adsorber, but the adsorption process itself has a certain amount of adsorption heat release, and the temperature of the adsorber will rise slightly, which is generally less than 20° C.

As the adsorber does not need to be heated during regeneration, the regeneration step of the present application requires a very short time, generally not more than two hours. The shorter the regeneration time is, the faster the adsorbent can perform adsorption regeneration cycle, the higher the adsorbent utilization efficiency is, and the smaller the required adsorber volume and adsorbent amount are.

As a preferred embodiment of the present application, the small amount of gas with low impurity component content introduced into the adsorber during regeneration is product gas or depressurization gas, and the (volume) ratio of the gas to the product gas is less than 20%, with the temperature of lower than 0° C.

As a preferred embodiment of the present application, the minimum pressure in the adsorber is lower than −50 kPa (the pressures in the present application are all gauge pressures) during vacuumizing regeneration. The pressure of the adsorber is increased to the adsorption pressure by using product gas, feed gas or depressurization gas of other adsorbers during pressurization.

According to the needs of specific working conditions, the adsorbent in the present application can be one or more of aluminum oxide, silica gel, activated carbon or molecular sieve, the number of adsorbers can be one, two or more, and the adsorption pressure can also be determined according to specific working conditions.

In the present application, the amount of gas with low impurity component content introduced into the adsorber during regeneration is small, and the ratio (volume) to product gas is less than 20%. The main purpose is not to heat the adsorber, but to reduce the gas partial pressure of impurity gas in the adsorber to a very low state, so as to achieve the goal of desorbing impurity gas as completely as possible.

Compared with the prior art, the present invention has the following positive effects:

(I) According to the low-temperature adsorption method of the present invention, the adsorber does not need to be deliberately heated in the regeneration process, consumption of a large amount of energy and materials caused by frequent heating and cooling of the adsorber is avoided, and the low-temperature adsorption method has the advantages that operation is easy, energy consumption is low, and the device is suitable for long-time continuous operation.

(II) The low-temperature adsorption method of the present invention is featured by short time required by regeneration, high adsorbent recycling efficiency, small adsorber volume and adsorbent amount.

(III) The product gas obtained from a non-adsorptive phase by the method has high purity, which is high-purity gas with purity of higher than 99.99% or ultra-high-purity gas with higher purity; the method has high yield, up to more than 88%.

DETAILED DESCRIPTION

Figure 1:
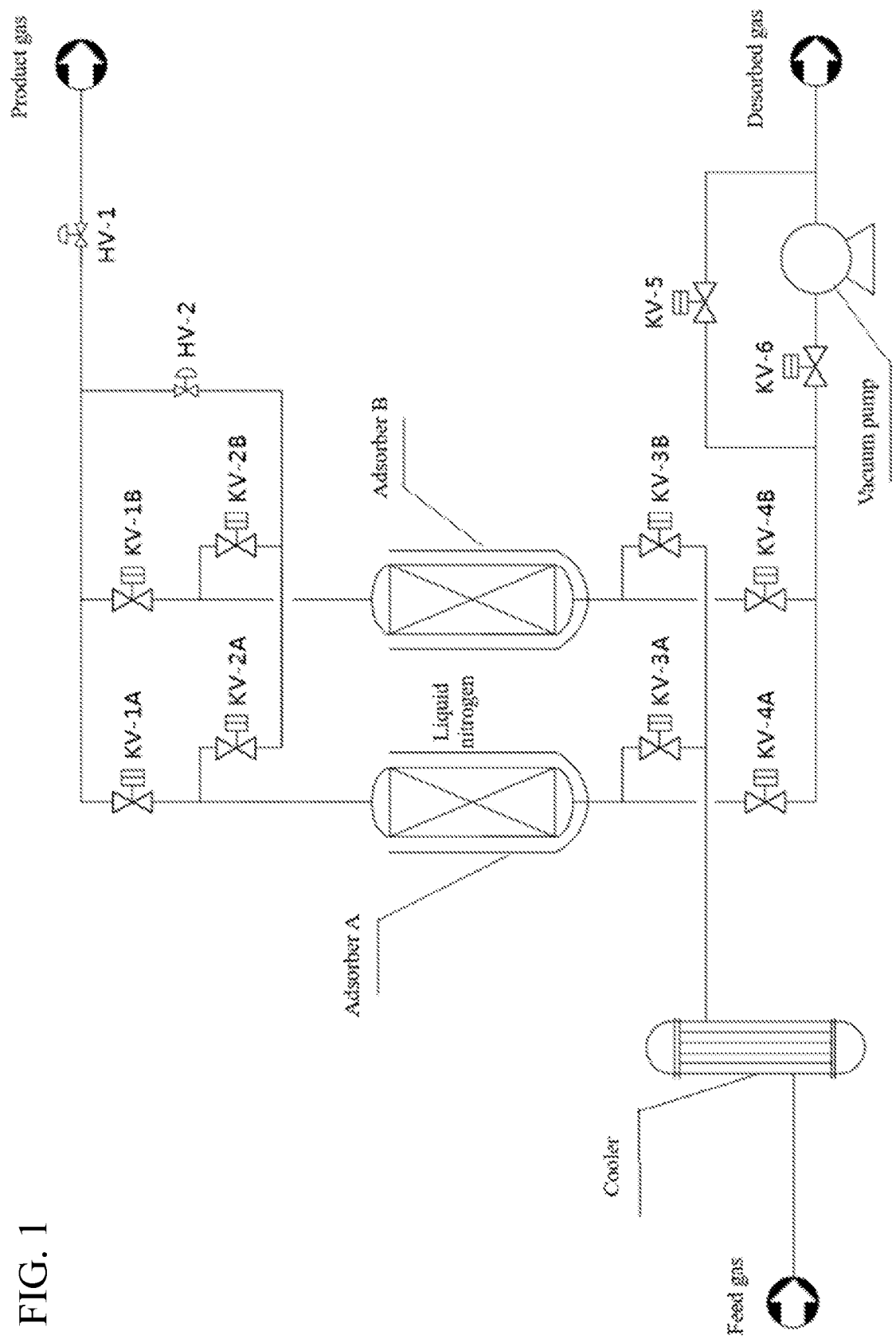
FIG. 1 is a schematic diagram of the process flow adopted in Embodiment 1 of the present invention.

A method for purification of high-purity or ultrahigh-purity gas by low temperature adsorption, comprising the following steps:

adsorption: feed gas containing impurities is blown into an adsorber filled with adsorbent, and the temperature of the adsorber is controlled lower than 0° C., so that the impurity gas is adsorbed on the adsorbent, and high-purity or ultra-high-purity product gas with purity of greater than or equal to 99.99% is obtained from a non-adsorptive phase;

depressurization: after the adsorption step, the residual gas in the adsorber is released, and the pressure in the adsorber is reduced to or close to the normal pressure;

regeneration: a vacuum pump is used to vacuumize the adsorber; at the same time, a small amount of gas with low impurity component content is introduced into the adsorber to regenerate the adsorbent, and the difference between the temperature of the adsorber during regeneration and the temperature of the adsorber during adsorption is less than 20° C.;

pressurization: the pressure of the adsorber is increased to the adsorption pressure.

As a preferred embodiment of the present application, the method is especially suitable for removing impurity gas from the following feed gases, i.e., the main component of the feed gas is any one of helium, hydrogen, argon, neon, krypton, xenon, radon, deuterium, tritium, nitrogen, oxygen, carbon monoxide and methane, and the impurity gas is any one of or the mixture of more of hydrogen, argon, neon, krypton, xenon, radon, deuterium, tritium, nitrogen, oxygen, carbon monoxide, methane, carbon dioxide, water or hydrocarbons. Generally, the volume content of the main component in the feed gas is more than 90%, preferably more than 99%, but even if the volume content of the main component in the feed gas is less than 90%, the purpose can be achieved by the method of the present application.

In the adsorption process recorded by the steps of this method, the temperature of the adsorber is −200° C. to −120° C., more preferably −190° C. to −170° C.

The temperature of the adsorber in the present application is always in a relatively stable low temperature state, and the method of keeping the adsorber at low temperature can be freely selected. Typical methods are as follows:

1. The adsorber is placed in a cryogenic container, such as a cryogenic container filled with liquid nitrogen;
2. The adsorber is insulated, the feed gas is cooled through a heat exchanger, and then the low-temperature feed gas is introduced into the adsorber to cool the adsorber.

However, no matter which method is used, there is no need to deliberately introduce materials or energy to heat the adsorber during regeneration of the adsorber, but the adsorption process itself has a certain amount of adsorption heat release, and the temperature of the adsorber will rise slightly, which is generally less than 20° C. The regeneration step of the present application requires a very short time, generally not more than two hours.

Preferably, the small amount of gas with low impurity component content introduced into the adsorber during regeneration is product gas or depressurization gas, and the (volume) ratio of the gas to the product gas is less than 20%, with the temperature of lower than 0° C.

Preferably, the minimum pressure in the adsorber is lower than −50 kPa (the pressures in the present application are all gauge pressures) during vacuumizing regeneration. The pressure of the adsorber is increased to the adsorption pressure by using product gas, feed gas or depressurization gas of other adsorbers during pressurization.

According to the needs of specific working conditions, the adsorbent in the present application can be one or more of aluminum oxide, silica gel, activated carbon or molecular sieve, the number of adsorbers can be one, two or more, and the adsorption pressure can also be determined according to specific working conditions.

In the present application, the amount of gas with low impurity component content introduced into the adsorber during regeneration is small, and the ratio (volume) to product gas is less than 20%. The main purpose is not to heat the adsorber, but to reduce the gas partial pressure of impurity gas in the adsorber to a very low state, so as to achieve the goal of desorbing impurity gas as completely as possible.

The implementation mode of the present invention is described below through specific examples, and those skilled in the art can easily understand other advantages and effects of the present invention from the contents disclosed in the Description. The present invention can also be implemented or applied in other different specific implementation modes, and various details in the Description can also be modified or changed based on different views and applications without departing from the spirit of the present invention. It should be noted that, the following embodiments and the features in the embodiments may be combined with each other in a non-conflicting situation.

It should be noted that, the technical solutions of the embodiments of the present invention will be described clearly and completely as follows in combination with the figures of these embodiments for clear understanding of the purposes, technical solutions and advantages of the present invention.

Apparently, the embodiments described are only some, but not all of the embodiments of the present invention. Generally, the components in the embodiments of the present invention described and shown in the figures herein may be arranged and designed in various configurations.

In addition, the present invention should point out that, in the present invention, if the specific process device or process step is not specified, the structure, connection relationship, location relationship, power source relationship, etc. involved in the present invention can be known by those skilled in the art on the basis of the prior art without creative labor.

Embodiment 1

In this embodiment, the process flow diagram of the method for refining ultra-high-purity gas by low-temperature adsorption is as shown in FIG. 1, and the specific steps are as follows: For the feed gas mainly composed of helium, the volume content of helium is 99%, the volume content of nitrogen is 1%, the gauge pressure is 1.0 MPa, and the temperature is normal temperature. First, it is cooled to about-180° C. through the cooler, and then enters the low-temperature adsorption device including two adsorbers. The adsorbent filled in the adsorber is activated carbon. The adsorber is always immersed in the liquid nitrogen container. During regeneration, it is not necessary to remove the liquid nitrogen container, remove the liquid nitrogen, or add materials and energy to heat the adsorber.

Taking adsorber A as an example, when the adsorber A performs adsorption, the valves KV-1A and KV-3A are opened, and the cooled feed gas enters the adsorber from the bottom of adsorber A. The temperature of the adsorber is about-190° C. The nitrogen in the feed gas is adsorbed on the adsorbent, and ultra-high-purity product gas with helium purity of 99.999% is obtained from the top of the adsorber.

After the adsorption step, the valves KV-1A and KV-3A are closed, and the valves KV-4A and KV-5 are opened. The residual gas in the adsorber will be discharged from the bottom of the adsorber, and the pressure of the adsorber will be relieved to normal pressure.

After the depressurization step, the valve KV-5 is closed, and the valve KV-6 is opened; the vacuum pump is used to vacuumize the adsorber. At the same time, the valve KV-2A is opened, and the opening of the valve HV-2 is adjusted; a small amount of product gas is introduced into the adsorber to regenerate the adsorbent. The amount of product gas introduced into the adsorber is about 10% of the total product gas, and the product gas temperature is about −185° C. The temperature of the adsorber during regeneration is about −188° C. The minimum pressure in the adsorber is about −80 kPa during vacuumizing regeneration. The total time of the regeneration step is about one hour.

After the regeneration step, the valves KV-4A and KV-6 are closed, and the opening of valve HV-2 is adjusted; the adsorber is charged with product gas, and the pressure of the adsorber is increased to the adsorption pressure, that is, the gauge pressure is 1.0 MPa.

So far, adsorber A has completed one adsorption regeneration cycle. The operation steps of adsorber B are similar to those of adsorber A, except that the adsorption regeneration steps between different adsorbers are staggered, so that the feed gas can be continuously fed and the product gas can be output continuously and stably.

The helium purity of the final product is 99.999% and the yield is 88%.

Embodiment 2

Figure 2:
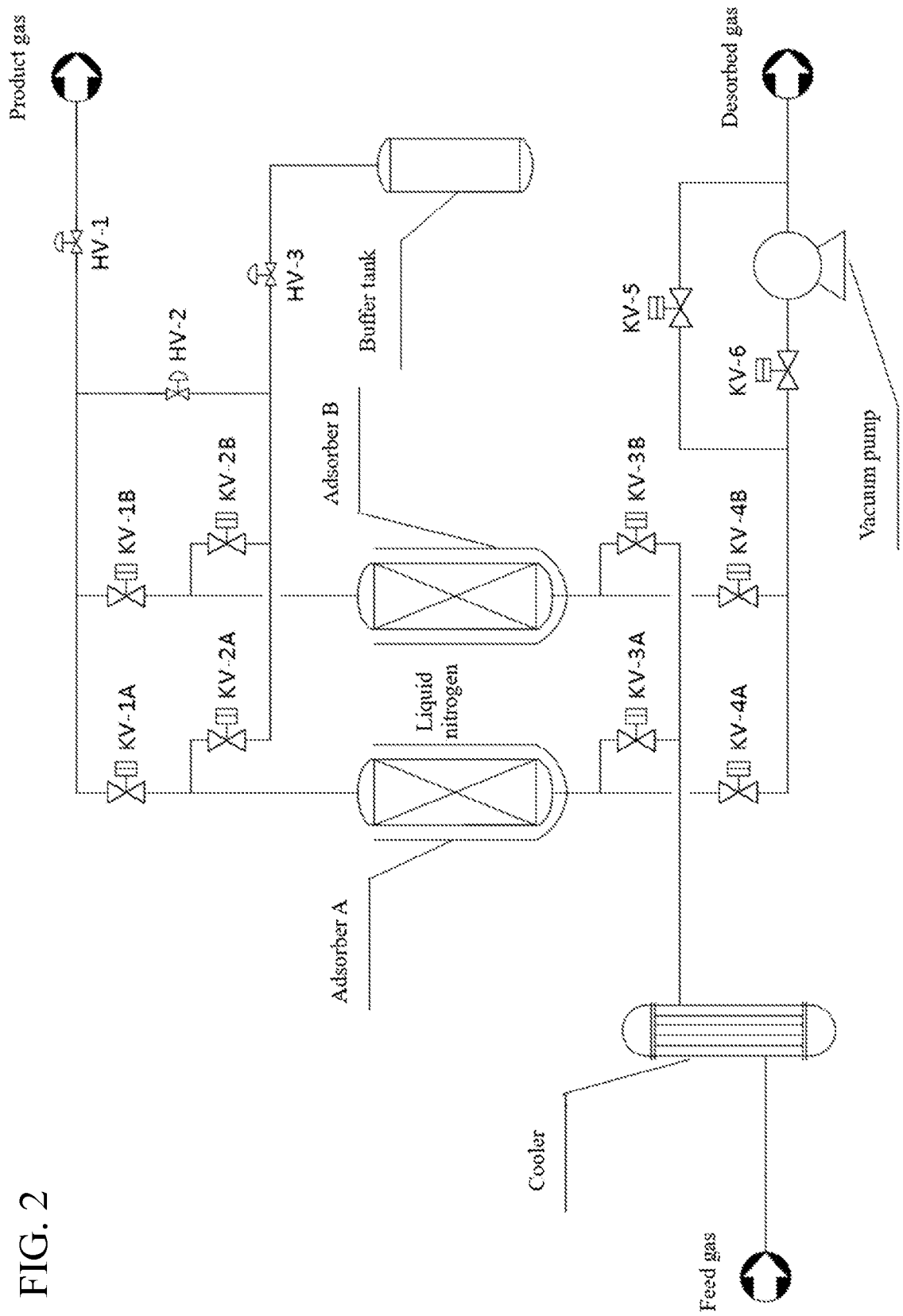
FIG. 2 is a schematic diagram of the process flow adopted in Embodiment 2 of the present invention.

In this embodiment, the process flow diagram of the method for refining high-purity gas by low-temperature adsorption is as shown in FIG. 2, and the specific steps are as follows:

For the feed gas mainly composed of hydrogen, the volume content of hydrogen is 95%, the volume content of nitrogen is 5%, the gauge pressure is 1.0 MPa, and the temperature is normal temperature. First, it is cooled to about −180° C. through the cooler, and then enters the low-temperature adsorption device including two adsorbers. The adsorbent filled in the adsorber is 5A molecular sieve. The adsorber is always immersed in the liquid nitrogen container. During regeneration, it is not necessary to remove the liquid nitrogen container, remove the liquid nitrogen, or add materials and energy to heat the adsorber.

Taking adsorber A as an example, when the adsorber A performs adsorption, the valves KV-1A and KV-3A are opened, and the cooled feed gas enters the adsorber from the bottom of adsorber A. The temperature of the adsorber is about −190° C. The nitrogen in the feed gas is adsorbed on the adsorbent, and high-purity product gas with hydrogen purity of 99.99% is obtained from the top of the adsorber.

After the adsorption step, the valves KV-1A and KV-3A are closed, and the valves KV-2A and HV-3 are opened. The residual gas in the adsorber is blown into the buffer tank from the top of the adsorber, and the pressure in the adsorber is reduced from 1.0 MPa to 0.3 MPa. Then, the valves KV-2A and KV-3 are closed, and the valves KV-4A and KV-5 are opened. The residual gas in the adsorber will be discharged from the bottom of the adsorber, and the pressure of the adsorber will be relieved to normal pressure.

After the depressurization step, the valve KV-5 is closed, and the valve KV-6 is opened; the vacuum pump is used to vacuumize the adsorber. At the same time, the valve KV-2A is opened, and the opening of the valve HV-3 is adjusted; depressurization gas stored in the buffer tank is introduced into the adsorber; after the depressurization gas is used up, the valve HV-3 is closed, and the valve HV-2 is opened; then a small amount of product gas is introduced to regenerate the adsorbent. The ratio of the total gas introduced into the adsorber during vacuumizing to the total product gas is 8%, and the product gas temperature is about −180° C. The temperature of the adsorber during regeneration is about −185° C. The minimum pressure in the adsorber is about-80 kPa during vacuumizing regeneration. The total time of the regeneration step is about 40 minutes.

After the regeneration step, the valves KV-4A and KV-6 are closed, and the opening of valve HV-2 is adjusted; the adsorber is charged with product gas, and the pressure of the adsorber is increased to the adsorption pressure, that is, the gauge pressure is 1.0 MPa.

So far, adsorber A has completed one adsorption regeneration cycle. The operation steps of adsorber B are similar to those of adsorber A, except that the adsorption regeneration steps between different adsorbers are staggered, so that the feed gas can be continuously fed and the product gas can be output continuously and stably.

The hydrogen purity of the final product is 99.99% and the yield is 90%.

Embodiment 3

Figure 3:
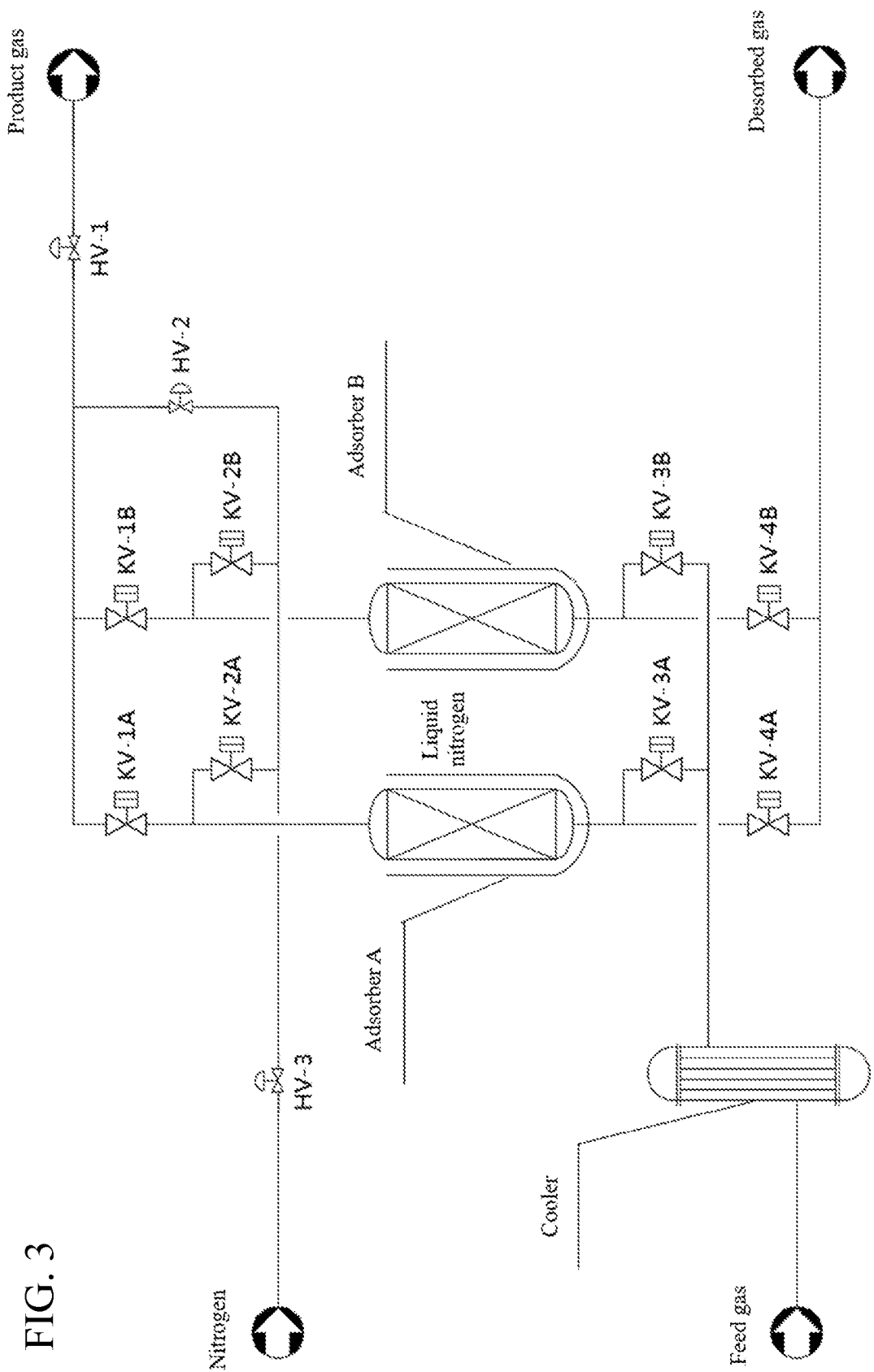
FIG. 3 is a schematic diagram of the process flow adopted in Embodiment 3 of the present invention.

In this embodiment, the process flow diagram of the method for refining high-purity gas by low-temperature adsorption is as shown in FIG. 3, and the specific steps are as follows:

For the feed gas mainly composed of helium, the volume content of helium is 99%, the volume content of nitrogen is 1%, the gauge pressure is 1.0 MPa, and the temperature is normal temperature. First, it is cooled to about −180° C. through the cooler, and then enters the low-temperature adsorption device including two adsorbers. The adsorbent filled in the adsorber is activated carbon.

Taking adsorber A as an example, when the adsorber A performs adsorption, the liquid nitrogen jacket outside the adsorber is filled with liquid nitrogen. The valves KV-1A and KV-3A are opened, and the cooled feed gas enters the adsorber from the bottom of adsorber A. As the temperature of the adsorber is normal temperature during regeneration, the temperature at the liquid nitrogen side outside the adsorber is low and the temperature at the center side is high during adsorption. With the introduction of low-temperature feed gas, the bottom temperature of the adsorber is low and the top temperature is high. The helium product obtained from the top of the adsorber has low purity at first, about 99.9%, and then slowly increases. Several hours later, after the temperature of the adsorber is uniform, high-purity product gas with purity of 99.99% is obtained.

After the adsorption step, the valves KV-1A and KV-3A are closed, and the valve KV-4A is opened. The residual gas in the adsorber will be discharged from the bottom of the adsorber, and the pressure of the adsorber will be relieved to normal pressure.

After the depressurization step, the liquid nitrogen is removed from the jacket outside the adsorber; the valves KV-2A and HV-3 are opened, and normal temperature nitrogen is blown to heat and regenerate the adsorber. Due to the low heat capacity of nitrogen, the volume of regenerated nitrogen needs to be more than 10 times of the feed gas. After the temperature of the adsorber rises to normal temperature, it is required to maintain at least 8 hours at normal temperature, so that the adsorbent can be regenerated completely. Upon completion of regeneration, part of the product gas is introduced to replace the residual nitrogen in the adsorber, so as not to affect the purity of product helium in the next adsorption. The time required for the entire regeneration step is greater than 24 hours.

After the regeneration step, the valves KV-4A and KV-3 are closed, and the opening of valve HV-2 is adjusted; the adsorber is charged with product gas, and the pressure of the adsorber is increased to the adsorption pressure, that is, the gauge pressure is 1.0 MPa. So far, adsorber A has completed one adsorption regeneration cycle.

The purity of the product helium obtained by this method fluctuates greatly. Generally, the highest purity can only reach 99.99% of the high-purity gas level, and the yield of qualified high-purity gas is about 75%. The regeneration of the adsorbent takes a long time and the adsorbent recycling efficiency is low, so the adsorber volume and adsorbent amount are large, more than 10 times of that of Embodiment 1.

The aforementioned basic example of the present invention and its further selection examples can be freely combined to form multiple embodiments, which can be adopted and claimed by the present invention. In the solutions of the present invention, each selection example can be arbitrarily combined with any other basic example and selection example. Those skilled in the art know that there are many combinations.

All above are only preferred embodiments of the present invention, which do not limit the scope of the present invention. All alterations, equivalent replacements and improvements, without departing from the spirit and principle of the present invention, shall fall into the protection scope of the present invention.

The invention claimed is:

1. A method for purification of gas by low temperature adsorption, comprising:
    in an adsorption step, passing a feed gas containing impurities into an adsorber containing an adsorbent to obtain a purified product gas, of the adsorber is at a temperature of lower than 0° C. under an adsorption pressure, so that a least a portion of the impurities is adsorbed on the adsorbent;
    in a depressurization step, reducing a pressure in the adsorber to about a normal atmospheric pressure and releasing a depressurization gas;
    in a regeneration step, vacuumizing the adsorber using a vacuum pump and simultaneously passing a purge gas through the adsorber for a period of time to regenerate the adsorbent, wherein the regeneration step is carried out without heating and a difference between the temperature of the adsorber during regeneration and the temperature of the adsorber during adsorption is less than 20° C.; and
    in a pressurization step, increasing a pressure of the adsorber to the adsorption pressure,
    wherein a volume of the purge gas is less than 20% of a volume of the product gas.

2. The method according to claim 1, the purge gas is the purified product gas or the depressurization gas.

3. The method according to claim 1, wherein a temperature of the purge gas is lower than 0° C.

4. The method according to claim 1, wherein the period of time in the regeneration step is two hours or less.

5. The method according to claim 1, in the pressurization step, the pressure of the adsorber is increased to the adsorption pressure by the product gas or the feed gas.

6. The method for purification of high-purity or ultrahigh-purity gas by low temperature adsorption according to claim 1, wherein the adsorber is at a temperature of −200° C. to −120° C.

7. The method for purification of high purity or ultrahigh purity gas by according to claim 1, wherein, in the regeneration step, during vacuumizing, a minimum pressure in the adsorber is lower than a gauge pressure of −50 kPa.

8. The method according to claim 1, wherein the feed gas comprises one or more gas selected from the group of helium, hydrogen, argon, neon, krypton, xenon, radon, deuterium, tritium, nitrogen, oxygen, carbon monoxide and methane; the impurities is one or more gas selected from the group consisting of hydrogen, argon, neon, krypton, xenon, radon, deuterium, tritium, nitrogen, oxygen, carbon monoxide, methane, carbon dioxide, water, and hydrocarbons.

9. The method according to claim 1, wherein the product gas has a purity of higher than 99.99%.

\* \* \* \* \*